United States Patent Office 3,156,700
Patented Nov. 10, 1964

1

3,156,700
4-SUBSTITUTED 1,2-DIARYL-3,5-DIOXO-
PYRAZOLIDINES
Louis Muslin, Rudolf Pfister, and Franz Hafliger, Basel,
Switzerland, assignors to Geigy Chemical Corporation,
Ardsley, N.Y., a corporation of Delaware
No Drawing. Filed Feb. 23, 1961, Ser. No. 90,975
Claims priority, application Switzerland Feb. 24, 1960
12 Claims. (Cl. 260—310)

The present invention concerns new derivatives of 1,2-diphenyl-3,5-dioxo-pyrazolidine having valuable pharmacological properties, and their salts with inorganic and organic bases.

It has been found that 4-substituted 1,2-diaryl-3,5-dioxo-pyrazolidines of the general formula

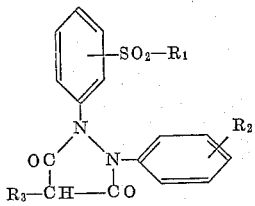

(I)

wherein:

$R_1$ represents an alkyl radical having at most 3 carbon atoms, $R_2$ represents hydrogen, an alkyl or alkoxy radical having at most 4 carbon atoms or an alkylsulphonyl radical having at most 3 carbon atoms, a halogen atom or a hydroxyl group, and $R_3$ represents hydrogen or a hydrocarbon radical having at most 10 carbon atoms, the chain and/or any ring of which can be interrupted by O, S, SO or $SO_2$, and at multiple bond carbon atoms of which halogen atoms can be present as substituents, or the tautomeric forms thereof and their salts with inorganic and organic bases, have valuable antiphlogistic, analgesic and uricosuric activity and, at the same time, slight toxicity. They are suitable, for example, for the treatment of rheumatic complaints as well as of gout, for which purposes they can be administered per os or rectally or, in the form of aqueous solutions of their salts, also parenterally, e.g. intramuscularly or intravenously. The new compounds are also active in releasing other drugs from their plasma binding and thus increasing their biologic activity or changing their distribution pattern in the organism.

The new compounds of the general Formula I are produced by condensing, in the presence of an alkaline condensing agent, a malonic acid diester of the general formula

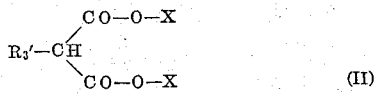

(II)

wherein $R_3'$ represents a radical corresponding to the definition for $R_3$ with the exception of radicals interrupted by SO or $SO_2$, and X represents a hydrocarbon radical having at most 8 carbon atoms, in particular a low alkyl radical, with a hydrazobenzene derivative of the general formula

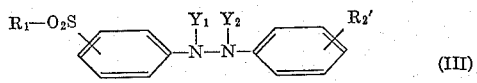

(III)

wherein:

$R_2'$ represents a radical corresponding to the definition for $R_2$ with the exception of the hydroxyl group, or it

2 represents an aralkoxy radical or a low α-alkoxy-alkyl radical in which the alkoxy group and the alkyl group can also be bound to each other to form a ring, and one of the symbols $Y_1$ and $Y_2$ represents hydrogen and the other represents hydrogen or an acyl radical which is easily split off, and $R_1$ has the meaning given above;

or by reacting, in the presence of an acid binding agent, a malonic acid derivative of the general formula

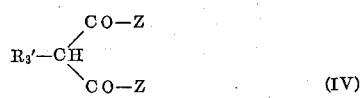

(IV)

wherein Z represents chlorine, bromine or an acetoxy radical, and $R_3'$ has the meaning given above, with a hydrazobenzene derivative of the general formula

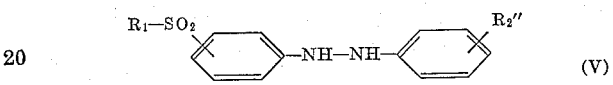

(V)

wherein:

$R_2''$ represents a radical corresponding to the definition for $R_2$ with the exception of the hydroxyl group, or it represents an acyloxy radical or a low α-alkoxy-alkyl radical in which the alkoxy group and the alkyl group can also be bound to each other to form a ring, or it represents an aralkoxy radical, and $R_1$ has the meaning given above;

or, finally, reacting, in the presence of an acid binding agent, a malonic acid ester derivative of the general formula

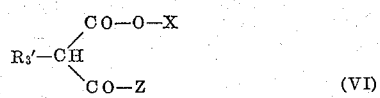

(VI)

wherein $R_3'$, X and Z have the meanings given above, with a hydrazobenzene derivative of the general Formula III and treating the reaction product so obtained with an alkaline condensing agent. Then the reaction product obtained by one of the three modifications of the process mentioned above in which $R_2'$ or $R_2''$ do not represent any of the radicals given for $R_2$, is hydrolysed or hydrogenolysed to form a compound of the general Formula I and, if desired, oxidising either previously or subsequently, a compound having a radical $R_3'$ interrupted by S to form a compound having a radical $R_3$ interrupted by SO or $SO_2$.

The compounds of the general Formula I are obtained by another modified process by reacting, in the presence of an N,N'-disubstituted carbodi-imide, in particular N,N'-dicyclohexylcarbodi-imide, a malonic acid of the general formula

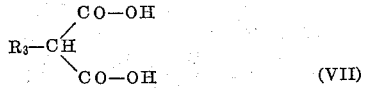

(VII)

wherein $R_3$ has the meaning given above, with a hydrazobenzene derivative of the general formula

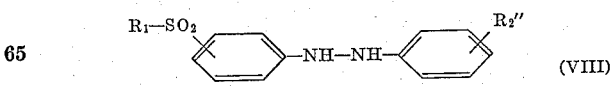

(VIII)

wherein $R_1$ and $R_2''$ have the meaning given above, and hydrolysing or hydrogenolysing a reaction product in which $R_2''$ represents a radical different from one given above for $R_2$, to form a compound of the general Formula I.

A third process for the production of compounds of the general Formula I consists in oxidising a compound of the general formula

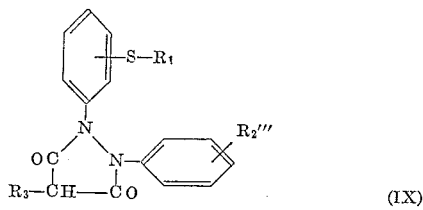

wherein $R_2'''$ represents a low alkylmercapto radical or a radical corresponding to the definition for $R_2$ and $R_1$ and $R_3$ have the meanings given above. If $R_3$ in the starting materials contains S or SO, these groups are oxidised to $SO_2$ at the same time.

Finally, compounds of the general Formula I in which $R_3$ is not hydrogen and contains no sulphur are obtained by condensing a compound of the general formula

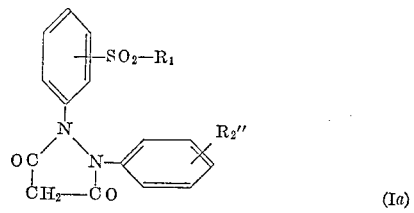

wherein $R_1$ and $R_2''$ have the meanings given above, which compound is obtained by one of the processes given above, with an oxo compound of the general formula $$R_3''=O \qquad (X)$$

wherein $R_3''$ represents a geminal divalent hydrocarbon radical, a chain and/or any ring of which can be interrupted by O, and at multiple bond carbon atoms of which halogen atoms can be present as substituents, and converting the compound obtained of the general formula

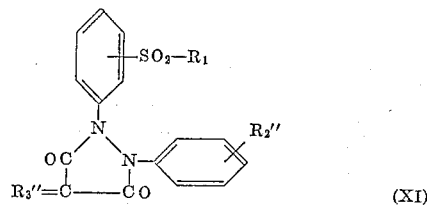

by reduction and, if necessary, by hydrolysis or hydrogenolysis depending on the meaning of $R_2''$, into a compound of the general Formula I.

If desired, the compounds of the general Formula I produced by any one of the processes given above are converted into their salts with inorganic or organic bases.

In the compound of the general Formula I as well as in the corresponding intermediate products, $R_1$ is, for example, the methyl, ethyl or vinyl radical. $R_2$ is, for example, hydrogen, the methylsulphonyl, ethylsulphonyl or vinylsulphonyl radical, the methyl, ethyl, isopropyl, isobutyl or tertiary butyl radical, the methoxy, ethoxy or n-propoxy radical or chlorine, bromine or fluorine. $R_3$ is, for example, the methyl, ethyl, n-propyl, isopropyl, n-butyl, isobutyl, sec. butyl, tert. butyl, n-amyl, isoamyl, n-hexyl, n-heptyl, n-octyl, n-decyl, crotyl, 3-chlorocrotyl, methallyl, cyclopentyl, cyclohexyl, 2,5-endomethylene-1-cyclohexenyl, 2,5-endomethylene-cyclohexylmethyl, cycloheptenyl, phenyl, p-chlorophenyl, p-methoxyphenyl, 3,4-dimethylphenyl, benzyl, p-chlorobenzyl, 3,4-dimethoxybenzyl, 3,4-methylenedioxybenzyl, β-phenylethyl, γ-phenylpropyl, β-methoxyethyl, β-ethoxyethyl, β-n-butoxyethyl, β-phenoxyethyl, β-benzyloxyethyl, β-methylthioethyl, γ-methylthiopropyl, β-isopropylthioethyl, β-phenylthioethyl, β-(4-chlorophenylthio)-ethyl, β-(3,4-dimethylphenylthio)-ethyl, β-(4-methoxyphenylthio)-ethyl, β-phenylsulphinylethyl or β-phenylsulphonylethyl radical or hydrogen.

In the formulae of the starting materials, X is advantageously the ethyl or methyl radical, also, for example, the n-butyl radical, cyclohexyl radical, phenyl radical or benzyl radical. If both $Y_1$ and $Y_2$ are not hydrogen, one of them is advantageously the acetyl radical. Homogeneous starting materials with regard to the position thereof are not absolutely necessary. If in the general Formula III, $R_2'$ has not the same meaning as $R_2$, it is advantageously the benzyloxy radical or the tetrahydropyranyl radical but also $R_2'$ can be radicals which together with the oxygen atom form an open acetal grouping such as, e.g. the methoxymethyl radical, the α-methoxyethyl radical and the α-ethoxyethyl radical. In general Formula V, if $R_2''$ has not the same meaning as $R_2$, it is advantageously an acetyl radical or one of the radicals given as representative of $R_2'$.

The condensation of malonic acid diesters of the general Formula II with hydrazobenzene derivatives of the general Formula III is performed advantageously in organic solvents such as benzene, toluene, xylene, butanol or dibutyl ether at raised temperatures, e.g. between 80 and 160°, the alcohol liberated being continuously distilled off. In this reaction, those alkaline condensing agents are suitable in general which are capable of replacing a mobile hydrogen atom by a metal atom, for example, alkali metals or the alcoholates, amides, hydrides thereof and metal organic compounds such as sodium, potassium, lithium, sodium alcoholate, potasium alcoholate, sodium amide, lithium amide, sodium hydride, lithium hydride, phenyl lithium and methyl lithium.

In particular, tertiary organic bases such as pyridine, dimethyl aniline, triethylamine or tributylamine in the presence or absence of additional organic solvents such as chloroform, diethyl ether or di-isopropyl ether are suitable as acid binding agents for the reaction of malonic acid derivatives of general Formula IV with hydrazobenzene derivatives of the general Formula V. In this case, the ring is closed advantageously between room temperature and about 100°.

Instead of performing the condensation in the presence of an acid binding agent, such agents which are suitable for the replacement of the hydrogen atoms at the N-atom of the hydrazobenzene derivatives by metal atoms such as, e.g. methyl lithium or ethyl magnesium bromide, can also be reacted immediately before the condensation with the hydrazobenzene derivatives to form, e.g. N,N'-dilithium compounds or N,N'-bis-magnesium bromide compounds and the latter compounds can be treated with malonic acid derivatives of the general Formula IV.

The hydrogenolysis of condensation products which contain an aryloxy radical $R_2'$ or $R_2''$ is performed, for example, in the presence of palladium charcoal even at room temperature and atmospheric pressure. For the hydrolysis of condensation products containing an acetal radical $R_2'$ or $R_2''$, for example dilute hydrochloric acid in methanol at a moderately raised to boiling temperature is suitable, and, for example, dilute caustic soda lye in the same temperature range is suitable for the hydrolysis of compounds containing an acyloxy radical, e.g. an acetoxy radical $R_2''$.

The ring between a malonic acid of the general Formula VII and a hydrazobenzene derivative of the general Formula VIII is closed by treatment with, for example, N,N'-dicyclohexylcarbodi-imide in an inert organic solvent, for example a solvent in which the starting materials and the reaction product dissolve well but in which N',N-dicyclohexyl urea does not dissolve well, such as, e.g. dioxan. Ring closure occurs a room temperature.

In particular hydrogen peroxide in a solvent such as, e.g. glacial acetic acid, at temperatures between about 40–100° is suitable as agent for the oxidation of alkylthio compounds of the general Formula IX to the corresponding alkylsulphonyl compounds of the general Formula I. Also compounds having a radical $R_3$ interrupted by S are oxidised under the same conditions to form compounds having a radical $R_3$ interrupted by $SO_2$ but the oxidation of S to SO with the same oxidising agent occurs at room temperature.

Compounds of the general Formula Ia and oxo compounds of the general Formula X can be condensed, for example, by boiling the components in glacial acetic acid and the compounds obtained of the general Formula XI are reduced, for example, by means of hydrogen in the presence of palladium charcoal at about 20–60° under atmospheric pressure in methanol or ethanol.

Many of the starting materials of the general Formulae II, IV, VI and VII are already known and others can be produced in an analogous manner. Hydrazobenzene derivatices of the general Formulae III and V are obtained from the corresponding azobenzene derivatives for example by reduction with zinc and aqueous-alcoholic caustic soda lye. Azobenzene derivatives both rings of which are substituted in the same way are obtained, for example, by reduction of alkylsulphonyl nitrobenzenes and azo benzene derivatives with differently substituted rings are obtained, for example, by condensation of anilines and nitrosobenzenes, but in this condensation at least one reaction component must contain an alkylsulphonyl or an alkenylsulphonyl radical. In addition, starting materials of the general formulae III and V are obtained, for example, by coupling alkylsulphonylbenzene diazonium halides with phenol, converting the alkylsulphenyl-hydroxy-azobenzenes obtained into their benzyl ethers, O-acetyl derivatives or O-tetrahydropyranyl derivatives, and reducing these to the corresponding hydrazobenzene derivatives. In this case, O-acetyl derivatives must be reduced in as neutral conditions as possible, for example by placing the O-acetyl derivative and the zinc dust in a suitable solvent, slowly adding glacial acetic acid dropwise while stirring until the solution becomes colourless and then immediately filtering off the zinc under suction.

With alkali hydroxides, the new compounds of the general Formula I form monobasic salts which are fairly easily to easily soluble. Solutions thereof can be produced direct by dissolving the new compounds in the calculated amount of alkali lye, i.e. in solutions of lithium, sodium or potassium hydroxide. Most of the new compounds also dissolve in alkali hydrogen carbonate solutions.

In solution, the new compounds of Formula I occur in tautomeric forms of the formulae:

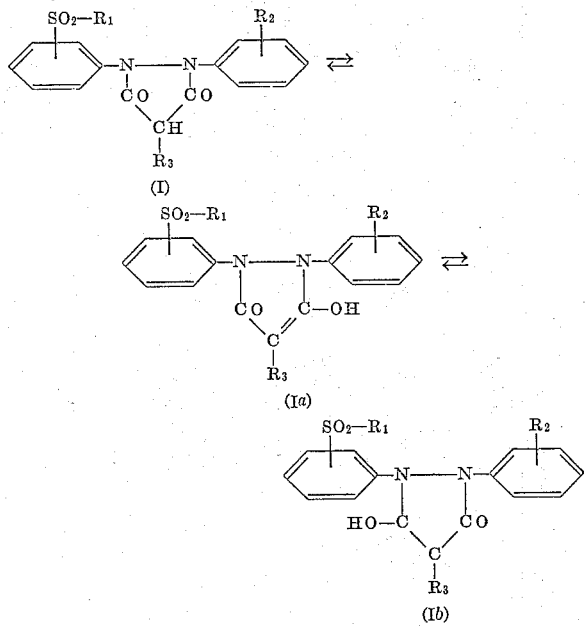

wherein $R_1$, $R_2$ and $R_3$ have the meanings given above.

The new compounds form salts in which the mesomeric anion occurs in the following contributing structures:

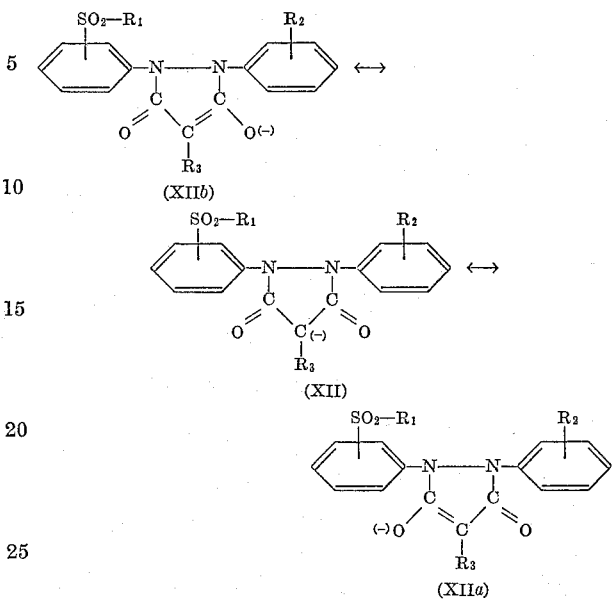

wherein $R_1$, $R_2$ and $R_3$ have the meanings given above.

The new compounds produced according to the invention or their alkali metal salts or salts with organic bases such as, e.g. dimethylaminoethanol, diethylaminoethanol or piperazine, can be converted into medicaments by combination with suitable pharmaceutical carriers. The solutions of the alkali metal salts of the new compounds mentioned above have a neutral to weakly alkaline reaction and are well suited, therefore, for injection. The medicaments can also be in the form of capsules, powders, tablets and other forms suitable for peroral administration and can be produced, for example by mixing the active ingredients, i.e. the new substituted 1,2-diphenyl-3,5-dioxo-pyrazolidines with pharmaceutical carriers such as starch, lactose, stearic acid, talcum, magnesium stearate etc. They can also be made up to form suppositories with semi-solid substances having a suitable melting range, e.g. cocoa butter.

Exemplary generic compound of general Formula I is one wherein $R_3$ represents hydrogen or an alkyl radical having at most 10 carbon atoms, furfuryl, phenyllower-alkyl, phenylthioloweralkyl, phenylsulphinyl-loweralkyl, phenylsulphonyl-loweralkyl, aralkyl or chlorophenyl, lower alkyl being a group containing 1–4 carbon atoms. An effective generic compound of general Formula I is one wherein $R_1$ represents methyl, $R_2$ represents hydrogen, methyl, methoxy, methylsulphonyl, chlorine or hydroxy and $R_3$ represents hydrogen, furfuryl, lower alkyl having at most 4 carbon atoms, chlorophenyl, phenylthioethyl, benzyl, β-phenylsulphinylethyl or β-phenylsulphonylethyl. Particularly advantageous generic compound of general Formula I is one wherein $R_1$ represents methyl, $R_2$ represents hydrogen, methylsulphonyl, methyl or hydroxy and $R_3$ represents n-butyl, phenylthioethyl, hydrogen or benzyl.

The following examples illustrate the production of the new compounds. Parts are given therein as parts by weight and their relationship to parts by volume is as that of grammes to cubic centimetres. The temperatures are in degrees centigrade.

*Example 1*

60 parts of n-butyl malonic acid diethyl ester and 66 parts of p-methylsulphonyl-hydrazobenzene (M.P. 179°) are added in a nitrogen atmosphere to the solution of 6 parts of sodium in 100 parts by volume of anhydrous ethanol. 350 parts by volume of anhydrous xylene are added and the alcohol is allowed to distill off at a bath temperature of 130–140° in a weak stream of nitrogen for 12 hours. The residue, cooled to 5°, is stirred into 250 parts by volume of water and 200 parts by volume of ether. The aqueous phase is again extracted with ether and is then made acid to congo red paper with hydrochloric acid. The precipitated crystals are recrystallised from ethanol. The 1-p-methylsulphonylphenyl-2-phenyl-3,5-dioxo-4-n-butyl-pyrazolidine melts at 164°. In an analogous manner are produced: 1,2-bis-(m-methylsulphonylphenyl) - 3,5 - dioxo-4-n-butyl-pyrazolidine (M.P. 145° from ethanol) from m,m'-bis-methylsulphonyl-hydrazobenzene (M.P. 198°), and 1-(p-methylsulphonylphenyl) - 2-phenyl-3,5-dioxo-4-(p-chlorophenyl)-pyrazolidine from p-chlorophenyl malonic acid diethyl ester and 1 - (p - methylsulphonylphenyl)-2-phenyl-3,5-dioxo-4-furfuryl-pyrazolidine from furfuryl malonic acid diethyl ester.

*Example 2*

A solution of 6.9 parts of n-butyl malonic acid dichloride in 10 parts by volume of anhydrous benzene is added dropwise at 0–5° into the suspension of 12 parts of p,p'-bis-methylsulphonyl-hydrazobenzene (M.P. 195°) in 150 parts by volume of anhydrous benzene and 7 parts of pyridine. The temperature is raised to 80° within 2 hours and then the reaction mixture is refluxed for 4 hours. It is extracted twice with 2 N-hydrochloric acid at room temperature and then several times with dilute sodium hydrogen carbonate solution. This extract is made acid to congo red paper and the precipitated crystals are recrystallised from ethanol. The 1,2 - bis-(p-methylsulphonylphenyl)-3,5-dioxo-4-n-butyl-pyrazolidine melts at 222°.

The compounds described in Example 1 can be obtained in an analogous manner. Also in an analogous manner, from m-methylsulphonyl-hydrazobenzene (M.P. 134°), 1-(m-methylsulphonylphenyl)-2-phenyl-3,5-dioxo-4-n-butyl-pyrazolidine is obtained M.P. 98° (from alcohol); from p-methylsulphonyl-p'-methyl-hydrazobenzene (M.P. 147°), 1-(p-methylsulphonylphenyl)-2-(p-tolyl)-3, 5 - dioxo - 4-n-butyl-pyrazolidine is obtained M.P. 128° (from alcohol); from p-methylsulphonyl-m'-methyl-hydrazobenzene (M.P. 114°), 1-(p-methylsulphonylphenyl)-2-(m-tolyl)-3,5-dioxo-4-n-butyl-pyrazolidine is obtained M.P. 160° (from alcohol), from p-methylsulphonyl-p'-methoxy - hydrazobenzene, 1-(p-methylsulphonylphenyl)-2-(p-anisyl)-3,5-dioxo-4-n-butyl-pyrazolidine is obtained and from p-methylsulphonyl-p'-chloro-hydrazobenzene, 1-(p - methylsulphonylphenyl) - 2-(p-chlorophenyl)-3,5-dioxo - 4-n-butyl-pyrazolidine is obtained. By the same process, from p - methylsulphonyl-hydrazobenzene and phenyl thioethyl malonic acid dichloride (produced from phenyl thioethyl malonic acid with excess thionyl chloride at 50° and subsequent distillation off of the thionyl chloride in vacuo), 1-(p-methylsulphonylphenyl)-2-phenyl-3, 5-dioxo-4-phenylthioethyl-pyrazolidine is obtained, M.P. 123° (from ethanol/ethyl acetate).

*Example 3*

13.1 parts of p-methylsulphonyl-hydrazobenzene and 5.2 parts of malonic acid are dissolved in 250 parts by volume of anhydrous dioxan. 21.6 parts of N,N'-dicyclohexyl carbodi-imide are added and the whole is left for 12 hours. The dicyclohexyl urea which precipitates crystalline is filtered off under suction and the filtrate is concentrated at 11 Torr. The residue is dissolved in warm ethyl acetate and left to stand. Crystals of 1-(p-methylsulphonylphenyl) - 2-phenyl-3,5-dioxo-pyrazolidine separate out (M.P. 224°).

*Example 4*

1 - (p-methylsulphonylphenyl)-2-(p-benzyloxyphenyl)-3,5-dioxo-4-n-butyl-pyrazolidine (M.P. 184°, from ethanol) is obtained according to Example 2 from p-methylsulphonyl-p'-benzyl-oxy-hydrazobenzene (M.P. 176°) and butyl malonic acid dichloride. 79 parts of this product are dissolved in 1000 parts by volume of dioxan and the solution is hydrogenated in the presence of 10 parts of about 5% palladium charcoal at room temperature and atmospheric pressure. The calculated amount of hydrogen has been taken up after 16 hours. The catalyst is filtered off and the filtrate is concentrated at 11 Torr. The residue is distributed between ethyl acetate and dilute sodium carbonate solution. This is made acid to congo red paper and the crystals which precipitate are recrystallised from isopropanol. The 1-(p-methylsulphonylphenyl)-2-(p-hydroxyphenyl)-3,5-dioxo-4-n-butyl-pyrazolidine melts at 155°.

*Example 5*

1.65 parts of 1-(p-methylsulphonylphenyl)-2-phenyl-3, 5-dioxo-pyrazolidine are dissolved while warming in 42 parts by volume of glacial acetic acid and, after addition of 0.51 part by volume of benzaldehyde, the solution is heated to 95–100° for 1 hour. After cooling, the orange-red solution is hydrogenated in the presence of 5% palladium charcoal at room temperature and atmospheric pressure. After the calculated amount of hydrogen has been taken up the colour changes to pale yellow. The catalyst is filtered off and the filtrate is concentrated as much as possible at 11 Torr. The residue is crystallised from alcohol whereupon 1-(p-methylsulphonylphenyl)-2-phenyl-3,5-dioxo-4-benzyl-pyrazolidine is obtained as a yellowish oil.

*Example 6*

4 parts of 1,2-bis-(o-methylthiophenyl)-3,5-dioxo-4-n-butyl-pyrazolidine are dissolved in 80 parts by volume of glacial acetic acid and 4.1 parts of 30% aqueous hydrogen peroxide solution are added. The temperature is raised within 4 hours to 70° and this temperature is maintained until the oxidising agent has been used up (2 hours about). The mixture is concentrated as much as possible at 11 Torr and the residue is distributed between ethyl acetate and dilute sodium hydrogen carbonate. The organic phase is extracted with dilute sodium carbonate solution. On making this extract acid to congo blue paper, crystals are obtained which are recrystallised from ethyl acetate. 1,2 - bis-(o-methylsulphonylphenyl)-3,5-dioxo-4-n-butyl-pyrazolidine is obtained which melts at 189°.

In an analogous manner, 1-(p-methylsulphonylphenyl)-2 - phenyl - 3,5-dioxo-4-(β-phenylthioethyl)-pyrazolidine may be oxidised with one equivalent of hydrogen peroxide at 25° to the 1-(p-methylsulphonylphenyl)-2-phenyl-3,5-dioxo - 4 - (β-phenylsulphinylethyl)-pyrazolidine or with two equivalents of hydrogen peroxide at 70° to the 1-(p-methylsulphonylphenyl) - 2-phenyl-3,5-dioxo-4-(β-phenylsulphonylethyl)-pyrazolidine.

What we claim is:
1. A compound of the formula

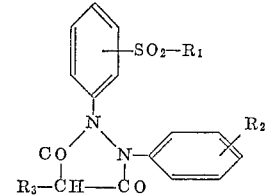

wherein:
$R_1$ is alkyl having at most 3 carbon atoms,
$R_2$ is a member selected from the group consisting of hydrogen, alkyl having at most 4 carbon atoms, alkoxy having at most 4 carbon atoms, alkylsulphonyl having at most 3 carbon atoms, halogen and hydroxyl,
and $R_3$ is a member selected from the group consisting of hydrogen, alkyl having at most 10 carbon atoms, phenyl-loweralkyl, furfuryl, phenylthio-loweralkyl, phenylsulphinyl-loweralkyl, phenylsulphonyl-loweralkyl, chlorobenzyl, dimethoxybenzyl, methylenedioxybenzyl and chlorophenyl.

2. 1 - p - methylsulphonylphenyl - 2 - phenyl - 3,5-dioxo-4-n-butyl-pyrazolidine.

3. 1,2 - bis - (m - methylsulphonylphenyl) - 3,5 - dioxo-4-n-butyl-pyrazolidine.

4. 1,2 - bis - (p - methylsulphonylphenyl) - 3,5 - dioxo-4-n-butyl-pyrazolidine.

5. 1 - (m - methylsulphonylphenyl) - 2 - phenyl - 3,5-dioxo-4-n-butyl-pyrazolidine.

6. 1 - (p - methylsulphonylphenyl) - 2 - (p - tolyl)-3,5-dioxo-4-n-butyl-pyrazolidine.

7. 1 - (p - methylsulphonylphenyl) - 2 - (m - tolyl)-3,5-dioxo-4-n-butyl-pyrazolidine.

8. 1 - (p - methylsulphonylphenyl) - 2 - phenyl - 3,5-dioxo-4-phenylthioethyl-pyrazolidine.

9. 1 - (p - methylsulphonylphenyl) - 2 - phenyl - 3,5-dioxo-pyrazolidine.

10. 1 - (p - methylsulphonylphenyl) - 2 - (p - hydroxyphenyl)-3,5-dioxo-4-n-butyl-pyrazolidine.

11. 1 - (p - methylsulphonylphenyl) - 2 - phenyl - 3,5-dioxo-4-benzyl-pyrazolidine.

12. 1,2 - bis - (o - methylsulphonylphenyl) - 3,5 - dioxo-4-n-butyl-pyrazolidine.

References Cited in the file of this patent

UNITED STATES PATENTS

| | | | |
|---|---|---|---|
| 2,674,600 | Haefliger | | Apr. 6, 1954 |
| 2,700,671 | Haefliger | | Jan. 25, 1955 |
| 2,835,677 | Haefliger et al. | | May 20, 1958 |
| 2,859,211 | Pfister et al. | | Nov. 4, 1958 |
| 2,877,233 | Teufel et al. | | Mar. 10, 1959 |
| 2,958,692 | Schroeder | | Nov. 1, 1960 |

FOREIGN PATENTS

| | | | |
|---|---|---|---|
| 707,611 | Great Britain | | Apr. 21, 1954 |
| 727,405 | Great Britain | | Mar. 30, 1955 |
| 775,925 | Great Britain | | May 29, 1957 |
| 1,048,710 | France | | Aug. 5, 1953 |